(12) United States Patent
Vovan (10) Patent No.: US 11,143,226 B2
(45) Date of Patent: Oct. 12, 2021

(54) TWO-PIECE BLIND FASTENER

(71) Applicant: SPS Technologies, LLC, Jenkintown, PA (US)

(72) Inventor: Terry Vovan, Upland, CA (US)

(73) Assignee: SPS Technologies, LLC, Jenkintown, PA (US)

( * ) Notice: Subject to any disclaimer, the term of this patent is extended or adjusted under 35 U.S.C. 154(b) by 215 days.

(21) Appl. No.: 16/201,775

(22) Filed: Nov. 27, 2018

(65) Prior Publication Data

US 2019/0162217 A1 May 30, 2019

Related U.S. Application Data

(60) Provisional application No. 62/631,560, filed on Feb. 16, 2018, provisional application No. 62/590,915, filed on Nov. 27, 2017.

(51) Int. Cl.
*F16B 13/06* (2006.01)
*F16B 19/10* (2006.01)
(Continued)

(52) U.S. Cl.
CPC .......... *F16B 13/061* (2013.01); *B23P 19/062* (2013.01); *F16B 5/02* (2013.01);
(Continued)

(58) Field of Classification Search
CPC .............. F16B 19/1063; F16B 19/1072; F16B 19/1054; F16B 19/1045; F16B 13/061;
(Continued)

(56) References Cited

U.S. PATENT DOCUMENTS 2,415,560 A 2/1947 Higley
2,789,597 A 4/1957 LaTorre
(Continued)

FOREIGN PATENT DOCUMENTS

DE 2744547 4/1979
EP 1690631 8/2006
(Continued)

OTHER PUBLICATIONS

International Search Report for International Application PCT/US2018/062653, dated Mar. 11, 2019.
(Continued)

*Primary Examiner* — Victor D Batson
*Assistant Examiner* — Amit Singh Dhillon
(74) *Attorney, Agent, or Firm* — Burris Law, PLLC (57) ABSTRACT

A blind fastener for connecting panels includes a bolt and nut. The bolt includes a shaft, bolt head, and lug. The bolt head is between the shaft and lug. The shaft defines external threads opposite the bolt head. The lug includes a first tool engagement portion and first frangible portion that connects the lug and bolt head. The nut includes a sleeve, nut head, and handling member. A central bore of the sleeve receives the shaft and defines internal threads mated with the external threads. The nut head is between the handling member and sleeve. The nut head extends radially from the sleeve and defines a recess that receives the bolt head. The handling member surrounds a portion of the lug. The handling member includes a second frangible portion and a second tool engagement portion. The second frangible portion couples the second tool engagement portion to the nut head.

20 Claims, 7 Drawing Sheets

(51) Int. Cl.
*F16B 5/02* (2006.01)
*F16B 31/02* (2006.01)
*F16B 19/00* (2006.01)
*B23P 19/06* (2006.01)
*F16B 37/14* (2006.01)

(52) U.S. Cl.
CPC ...... *F16B 19/1063* (2013.01); *F16B 19/1072* (2013.01); *F16B 31/021* (2013.01); *F16B 19/008* (2013.01); *F16B 37/145* (2013.01)

(58) Field of Classification Search
CPC ...... F16B 13/045; F16B 13/04; F16B 31/021; F16B 2013/006; F16B 33/004; F16B 19/008; F16B 5/02; F16B 37/145; B23P 19/062
See application file for complete search history.

(56) References Cited

U.S. PATENT DOCUMENTS

| | | | | |
|---|---|---|---|---|
| 2,863,351 | A | 12/1958 | Vaughn | |
| 2,884,098 | A * | 4/1959 | Hutchison | F16B 43/001 403/288 |
| 2,884,099 | A * | 4/1959 | Nenzell | F16B 19/008 411/548 |
| 3,117,486 | A * | 1/1964 | Matthews | F16B 37/122 411/417 |
| 3,230,818 | A * | 1/1966 | Siebol | B21J 15/045 411/34 |
| 3,253,495 | A * | 5/1966 | Orloff | F16B 19/1054 411/34 |
| 3,444,775 | A * | 5/1969 | Hills | F16B 31/021 411/5 |
| 3,667,340 | A * | 6/1972 | Black | F16B 37/067 411/38 |
| 4,170,919 | A * | 10/1979 | Siebol | F16B 19/1054 411/43 |
| 4,211,145 | A * | 7/1980 | Dolch | F16B 19/008 411/43 |
| 4,408,936 | A * | 10/1983 | Williamson | F16B 19/05 411/281 |
| 4,635,310 | A * | 1/1987 | Kendall | F16B 19/1054 470/11 |
| 4,747,204 | A * | 5/1988 | Pratt | B25B 21/001 29/523 |
| 4,826,372 | A * | 5/1989 | Kendall | F16B 1/0071 411/38 |
| 4,874,275 | A * | 10/1989 | Gotman | F16B 31/021 411/5 |
| 5,066,179 | A * | 11/1991 | Pratt | F16B 19/1063 411/34 |
| 5,131,107 | A * | 7/1992 | Pratt | F16B 19/1054 411/43 |
| 5,584,625 | A * | 12/1996 | Petri | F16B 31/021 411/178 |
| 5,599,147 | A * | 2/1997 | Luhm | F16B 19/1054 411/34 |
| 5,810,530 | A * | 9/1998 | Travis | F16B 19/1054 411/34 |
| 5,915,901 | A * | 6/1999 | Aasgaard | B29C 66/43 411/29 |
| 6,551,040 | B1 * | 4/2003 | Terry | F16B 19/1054 411/43 |
| 6,761,520 | B1 | 7/2004 | Dise | |
| 6,868,757 | B2 | 3/2005 | Hufnagl et al. | |
| 7,438,773 | B2 | 10/2008 | Denham et al. | |
| 7,857,563 | B2 | 12/2010 | Pratt | |
| 8,662,805 | B2 * | 3/2014 | Schaeffer | F16B 33/008 411/3 |
| 8,979,453 | B2 | 3/2015 | Hufnagl et al. | |
| 9,593,706 | B2 | 3/2017 | Bickford et al. | |
| 2004/0231467 | A1 * | 11/2004 | Hufnagl | F16B 23/0061 81/55 |
| 2007/0228743 | A1 * | 10/2007 | Kawano | F16B 35/06 292/242 |
| 2008/0025811 | A1 | 1/2008 | Auriol et al. | |
| 2008/0038077 | A1 * | 2/2008 | Aasgaard | F16B 37/065 411/29 |
| 2009/0053006 | A1 * | 2/2009 | Hufnagl | F16B 29/00 411/34 |
| 2011/0123289 | A1 | 5/2011 | Pratt | |
| 2012/0011702 | A1 * | 1/2012 | Pratt | F16B 19/1045 29/525.02 |
| 2012/0263556 | A1 * | 10/2012 | Pratt | F16B 19/1054 411/361 |
| 2013/0061451 | A1 | 3/2013 | Pratt | |
| 2013/0061452 | A1 | 3/2013 | Pratt | |
| 2013/0272815 | A1 * | 10/2013 | Hufnagl | F16B 19/1036 411/55 |
| 2014/0047699 | A1 * | 2/2014 | Pratt | F16B 19/1063 29/525.06 |
| 2014/0072385 | A1 * | 3/2014 | Pham | F16B 5/02 411/44 |
| 2014/0130335 | A1 * | 5/2014 | Bickford | B21J 15/12 29/525.02 |
| 2014/0201974 | A1 | 7/2014 | Mitchell | |
| 2015/0010370 | A1 | 1/2015 | Pratt | |
| 2015/0196951 | A1 * | 7/2015 | Bigot | F16B 19/1054 29/525.06 |
| 2016/0215804 | A1 * | 7/2016 | Hufnagl | F16B 19/1054 |
| 2017/0146045 | A1 | 5/2017 | Bickford et al. | |
| 2018/0238369 | A1 * | 8/2018 | Perroud | F16B 19/1072 |
| 2018/0238372 | A1 * | 8/2018 | Villet | F16B 19/10 |
| 2019/0186522 | A1 * | 6/2019 | Pailhories | F16B 19/1054 |

FOREIGN PATENT DOCUMENTS

| | | | | |
|---|---|---|---|---|
| EP | 2647851 | | 10/2013 | |
| EP | 3009695 | | 4/2016 | |
| EP | 2839172 | | 8/2017 | |
| EP | 3502460 | A1 * | 6/2019 | ........... F02M 57/005 |
| FR | 3037369 | | 7/2017 | |
| FR | 3053745 | | 1/2018 | |
| GB | 2163823 | | 3/1986 | |
| GB | 2383107 | | 6/2003 | |
| WO | 2018007324 | | 1/2018 | |

OTHER PUBLICATIONS

International Search Report for International Application PCT/US2018/062658, dated Mar. 11, 2019.
International Search Report for International Application PCT/US2018/062921, dated Mar. 26, 2019.

* cited by examiner

TWO-PIECE BLIND FASTENER

CROSS-REFERENCE TO RELATED APPLICATIONS

This application claims priority to and the benefit of U.S. Provisional Application 62/590,915 filed on Nov. 27, 2017. This application also claims priority to and the benefit of U.S. Provisional Application 62/631,560 filed on Feb. 16, 2018. This Application is also related to co-pending application titled "Blind Fastener With Frangible Nut," concurrently filed herewith and commonly assigned with the present application. The disclosures of the above applications are incorporated herein by reference.

FIELD

The present disclosure relates generally to fasteners and more particularly to blind fasteners having a core bolt and a nut around the core bolt for connecting panels from one side of the panels.

BACKGROUND

The statements in this section merely provide background information related to the present disclosure and may not constitute prior art.

A blind fastener is typically used to secure multiple panels together and to be installed from one side (i.e., a front side) of the panels. The blind fastener may include a core bolt and a sleeve surrounding the core bolt, which are inserted into a hole of the panels. A portion of the sleeve adjacent to a rear side of the panel may be deformed during installation of the fastener. The deformed portion of the sleeve provides a bearing surface to induce preload in the fastener such that the panels can be clamped together.

After the deformed portion of the sleeve is formed, the core bolt may be rotated to provide a preload to the fastener. When the fastener is completely installed, a front portion of the core bolt may break off. The break-off point of the typical core bolt cannot be controlled and rotation of the nut relative to the bolt typically needs to be controlled. In some circumstances it is advantageous to have the fully installed fastener be flush with panels for aesthetics and aerodynamic purposes. Typical fasteners need to be prepared for painting by post-installation grinding to be made flush with the panels when the break-off point is located outside the countersunk head of the sleeve.

It can be difficult to control rotation of both the bolt and the nut, while also ensuring a flush finished product, maximizing the speed of installation, and reducing cost per fastener. Furthermore, variations in grip length (i.e., the combined thickness of the panels at the fastener) can occur based on tolerances or design criteria. Accordingly, it is advantageous for the blind fastener to be able to adapt to variations in grip length without sacrificing strength of the joint. Moreover, the typical fastener does not include a torque control feature. When excessive torque is applied to the fastener, the sleeve of the fastener may flare out to form a tulip configuration, resulting in a defective installation.

These issues with the installation of blind fasteners are addressed by the present disclosure.

SUMMARY

In one form, a blind fastener for connecting a plurality of panels includes a bolt and a nut. The bolt includes a shaft, a bolt head, and a lug. The bolt head is disposed between the shaft and the lug and extends radially outward from the shaft. An end of the shaft opposite the bolt head defines external threads. The lug includes a first tool engagement portion and a first frangible portion that frangibly couples the lug to the bolt head. The nut includes a sleeve, a nut head, and a handling member. The sleeve includes a central bore configured to receive the shaft and defining internal threads configured to mate with the external threads. The nut head is disposed between the handling member and the sleeve. The nut head extends radially outward from the sleeve and defines a recess configured to receive the bolt head. The handling member is configured to surround at least a portion of the lug. The handling member includes a second frangible portion and a tool engagement portion. The second frangible portion frangibly couples the second tool engagement portion to the nut head. In a variety of alternate forms of the present disclosure: an end surface of the bolt head is flush with or recessed from an end surface of the nut head when the bolt is in threaded engagement with the nut; the first frangible portion is configured to break off from the bolt head such that an end surface of the bolt head is flush with or recessed from a front panel of the plurality of panels, and the second frangible portion is configured to break off from the nut head such that an end surface of the nut head is flush with or recessed from the front panel; a radially outward surface of the sleeve includes a plurality of dimples to retain the bolt from free rotation; the nut head further defines a first conical surface configured to abut a countersunk surface of a front panel of the plurality of panels; the first conical surface of the nut head extends radially outward to a radially outermost surface of the nut head, the handling member defining a second conical surface that extends from the outermost surface of the nut head; the nut defines a counter bore having an enlarged part and a threaded part, the enlarged part being formed in the handling member and having a larger inside diameter than the threaded part, wherein the threaded part defining the internal threads and being disposed in an end of the sleeve that is distal to the nut head; the blind fastener consists of two pieces when in a pre-installed condition, the bolt being a first one of the two pieces and the nut being a second one of the two pieces; the second frangible portion extends axially from the end surface of the nut head; the handling member has a minimum wall thickness at a location where the second frangible portion meets the nut head; the first frangible portion is a groove that extends around a full circumference of the bolt; the lug includes a rim that is disposed axially between the first tool engagement portion and the first frangible portion and extends radially outward of the tool engagement portion, the rim being adapted to limit axial movement of a tool toward the bolt head when the tool is engaged with the first tool engagement portion; the first tool engagement portion has a first predetermined shape and the second tool engagement portion has a second predetermined shape, the first predetermined shape adapted to engage a first mating portion of a tool to permit torque transmission between the tool and the bolt, the second predetermined shape adapted to engage a second mating portion of the tool to permit torque transmission between the tool and the nut; the blind fastener further includes a seal member in contact with the shaft and the sleeve to form a seal therebetween; when in a pre-installed condition, the sleeve includes a ductile zone that has a hardness that is less than a hardness of the nut head, a portion of the sleeve between the ductile zone and the nut head, and a portion of the sleeve at the internal threads; when in a pre-installed condition, the sleeve includes a variable annealed zone that has a hardness that is less than a hardness of the nut head and less than a hardness of the portion including the internal threads.

In another form, a blind fastener includes a single piece bolt and a single piece nut. The bolt includes a shaft, a bolt head, and a lug. The bolt head extends radially outward from the shaft. An end of the shaft opposite the bolt head defines external threads. The bolt head is disposed between the shaft and the lug. The lug includes a first tool engagement portion and a first frangible portion that frangibly couples the first tool engagement portion to the bolt head. The nut includes a sleeve, a nut head, and a handling member. The sleeve includes a central bore configured to receive the shaft. The sleeve defines internal threads engaged with the external threads. The nut head extends radially outward from the sleeve and defines a recess configured to receive the bolt head. An outer surface of the bolt head is flush or recessed relative to an outer surface of the nut head when the bolt head is received in the recess. The nut head is axially between the handling member and the sleeve. The handling member includes a second tool engagement portion and a second frangible portion. The second tool engagement portion is configured to surround at least a portion of the lug. The second frangible portion frangibly couples the second tool engagement portion to the nut head. The sleeve includes a first zone proximate to the nut head, a second zone at the internal threads, and a ductile zone between the first and second zones. The ductile zone is more ductile than the first or second zones. In a variety of alternate forms of the present disclosure: the nut head further defines a first conical surface configured to abut a countersunk surface of a front workpiece of a plurality of workpieces to be connected by the blind fastener, wherein the first conical surface of the nut head extends radially outward to a radially outermost surface of the nut head, and the handling member defines a second conical surface that extends radially outward from the outermost surface of the nut head; the blind fastener further includes a seal member in contact with the shaft and the sleeve to form a seal therebetween; the lug includes a rim that is disposed axially between the first tool engagement portion and the first frangible portion and extends radially outward of the tool engagement portion, the rim being adapted to limit axial movement of a tool toward the bolt head when the tool is engaged with the first tool engagement portion.

In another form, a method of fastening a plurality of workpieces using a blind fastener, the workpieces cooperating to define an aperture extending through the workpieces, the blind fastener including a bolt and a nut, includes inserting a shaft of the bolt into a sleeve of the nut. The shaft includes external threads and the sleeve includes mating internal threads. The method includes rotating the bolt relative to the nut to threadably mate the internal and external threads, inserting the bolt and nut through the aperture defined by the workpieces so that a first tool engagement portion on the bolt and a second tool engagement portion on the nut are disposed on a first side of the workpieces and the internal and external threads are disposed on a second side of the workpieces, deforming a region of the nut located on the second side of the workpieces by applying a torque on the first tool engagement portion while holding the second tool engagement portion rotationally and axially stationary, applying torque to the first tool engagement portion until a first frangible portion on the bolt shears the first tool engagement portion from a bolt head of the bolt to leave an outer surface of the bolt head flush or recessed relative to an outer surface of a nut head of the nut, and applying torque to the second tool engagement portion until a second frangible portion on the nut shears the second tool engagement portion from the nut head. In one of a variety of alternate forms of the present disclosure: the method further includes band annealing a region of the nut that is configured to extend axially outward from the second side of the workpieces.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
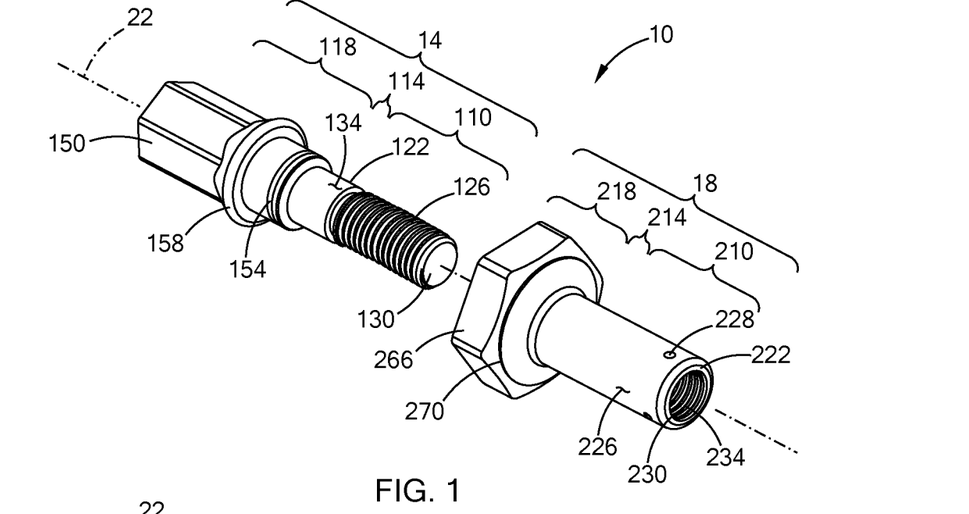
FIG. 1 is an exploded rear perspective view of a blind fastener in accordance with the teachings of the present disclosure.
Figure 2:
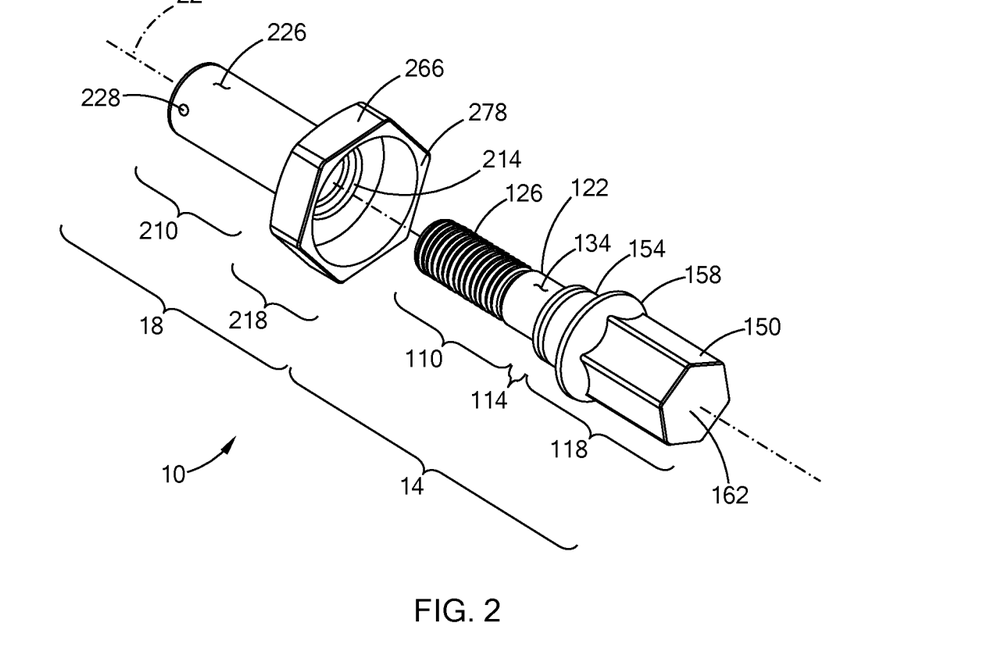
FIG. 2 is an exploded front perspective view of the blind fastener of FIG. 1.

Referring to FIGS. 1 and 2, a blind fastener 10 includes a bolt 14 and nut 18 that are configured to be matingly fitted together, as described in detail below, when the bolt 14 and nut 18 are positioned coaxially along a central axis 22 of the fastener. In the example provided, the bolt 14 can be a single, integral piece of material and the nut 18 can be a separate, single, integral piece of material. The bolt 14 and nut 18 can be formed from any suitable type of material such as a metal or alloy material for example. The bolt 14 can be formed of the same material as the nut 18, or can be a different suitable material. Some non-limiting examples of suitable materials are Inconel® 718, AMS5962, A268, AMS5762, or OD-608B.

Figure 3:
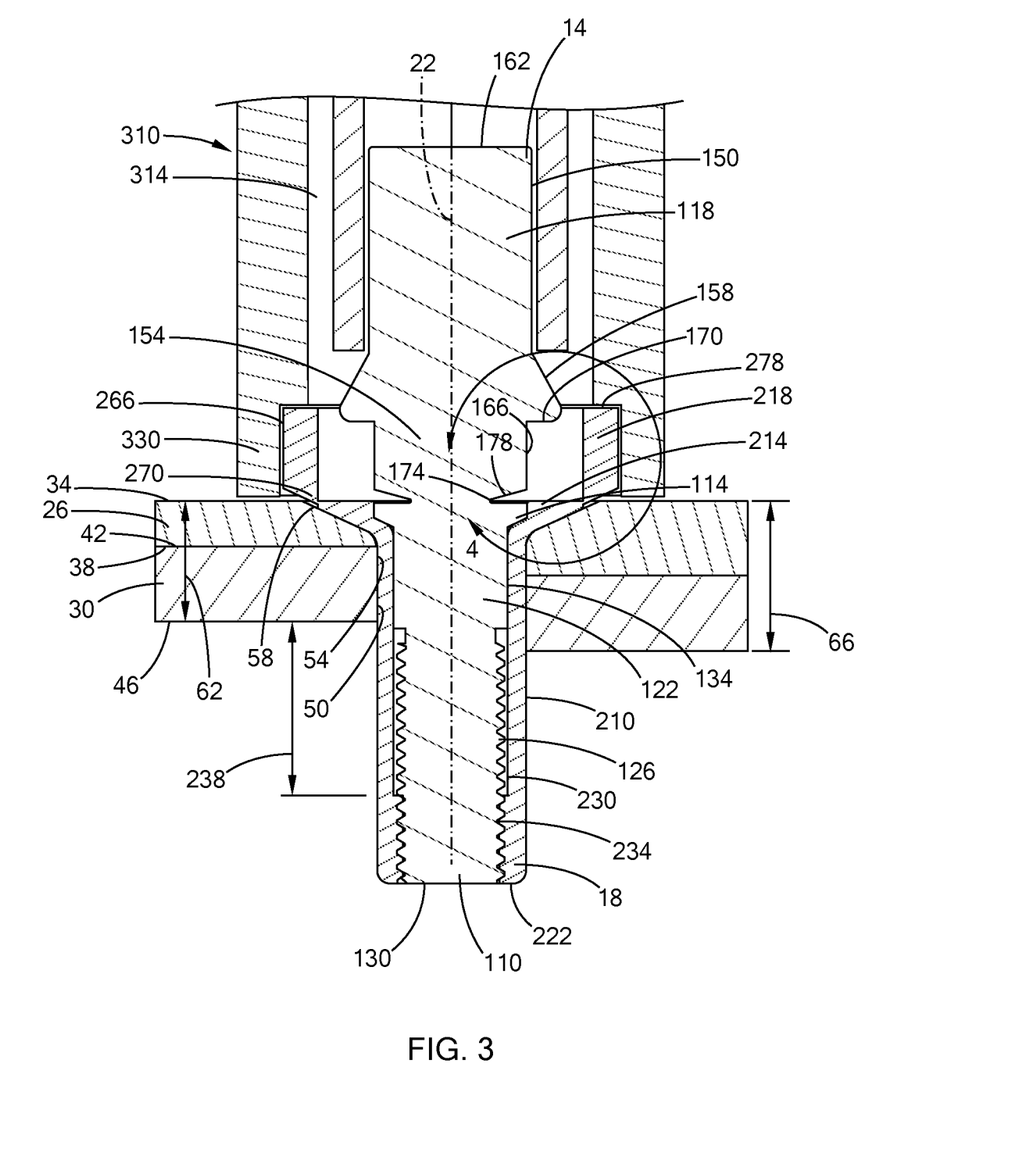
FIG. 3 is a cross-sectional view of the blind fastener of FIG. 1, illustrating the blind fastener in a pre-installed position relative to a minimum panel thickness and a maximum panel thickness.

With additional reference to FIG. 3, the blind fastener 10 secures a first workpiece 26 to a second workpiece 30. In one form, the first workpiece 26 is a plate or panel formed of any suitable material, such as metal (e.g., aluminum), carbon fiber composite or other suitable material for a given application. The first workpiece 26 has a first front surface 34 and a first back surface 38 opposite the first front surface 34.

The second workpiece 30 is similarly a plate or panel formed of any suitable material, such as metal (e.g., aluminum), carbon fiber composite, or other suitable material for a given application. The second workpiece 30 can be a similar or a different material from the first workpiece 26. However, if the workpieces 26, 30 are dissimilar materials that would induce galvanic corrosion (e.g., the first workpiece 26 is aluminum and the second workpiece 30 is a carbon fiber composite), an appropriate sealing/barrier (not shown) should be applied between the workpieces 26/30 and the blind fastener 10 to inhibit galvanic corrosion. The second workpiece 30 includes a second front surface 42 and a second back surface 46 opposite the second front surface. The second front surface 42 can face and abut the first back surface 38. The first workpiece 26 and the second workpiece 30 can each define apertures that cooperate when aligned to form a single aperture 50 through the first and second workpieces 26, 30 (i.e., through the first front surface 34 and through the second back surface 46). The aperture 50 can be coaxial with the axis 22. The aperture 50 can be countersunk or counter bored from the first front surface 34. In the example provided, the aperture 50 is counter sunk such that it includes a cylindrical inner bore 54 and a contact surface 58 that extends axially between the inner bore 54 and the first front surface 34 such that the aperture 50 widens toward the first front surface 34.

The portion of FIG. 3 to the left of the axis 22 illustrates the minimum nominal thickness between the first front surface 34 and the second back surface 46, also referred to as the minimum grip length 62. The portion of FIG. 3 to the right of the axis 22 illustrates the maximum nominal thickness between the first front surface 34 and the second back surface 46, also referred to as the maximum grip length 66. This difference in thickness that is shown between the left and right sides of the axis 22 is merely for illustration purposes and it is understood that the first and second workpieces 26, 30 typically have a uniform thickness around the blind fastener 10.

Returning generally to FIGS. 1, 2, and 3, the bolt 14 is formed from a single, integral piece of material and includes a shaft 110, a bolt head 114, and a lug 118 that are disposed about the axis 22. The shaft 110 is a generally cylindrically shaped body and includes a stem 122 and a threaded portion defining a plurality of external threads 126. In the example provided, the external threads 126 begin at an end of the shaft 110 that forms one terminal end 130 of the bolt 14. The stem 122 can have a generally smooth cylindrical first outer surface 134 with a diameter that is greater than or equal to the major diameter of the external threads 126. In the example provided, the stem 122 steps down in diameter from the diameter of the first outer surface 134 to a smaller diameter that is similar to the minor diameter of the external threads 126 and the external threads 126 extend axially along the shaft 110 until terminating adjacent to the step down, though other configurations can be used. In one alternative example, not shown, a sealant or a seal can be disposed between the termination of the external threads 126 and the step down to seal with the inner surface of the first central bore 230. The seal is configured to inhibit passage of fluids, such as water, oil, fuel, etc. The seal can be an elastomeric body, such as an o-ring for example. In another alternative example, not shown, stem 122 can transition to the external threads 126.

The bolt head 114 extends axially from an end of the stem 122 that is opposite the external threads 126. The bolt head 114 extends radially outward of the shaft 110 such that the bolt head 114 extends radially outward of the first outer surface 134.

Figure 4:
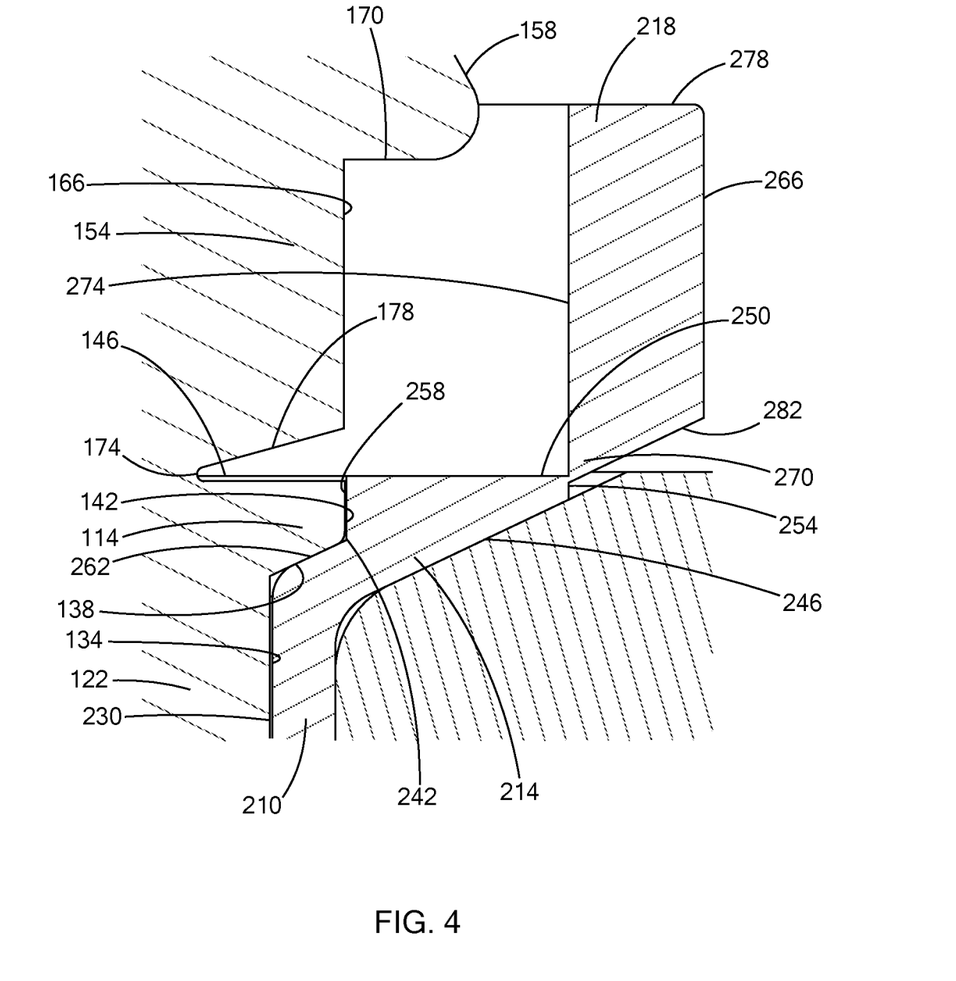
FIG. 4 is an enlarged cross-sectional detail view of a portion of the blind fastener of FIG. 1 in the pre-installed position.

With specific reference to FIG. 4, the bolt head 114 includes a clamp surface 138, a radially outermost perimeter surface 142, and a first end surface 146. The clamp surface 138 extends radially outward from the first outer surface 134. In the example provided, the clamp surface 138 extends radially outward at an angle relative to the first outer surface 134 that is greater than 90°, though other configurations can be used. The clamp surface 138 extends radially outward to the perimeter surface 142. The perimeter surface 142 extends axially in the direction away from the stem 122 to the first end surface 146. In the example provided, the perimeter surface 142 is generally parallel with the axis 22 such that the perimeter surface 142 is generally cylindrical in nature, though other configurations can be used. The first end surface 146 faces axially away from the stem 122 and extends radially inward from the perimeter surface 142. In the example provided, the first end surface 146 is generally perpendicular to the axis 22, though other configurations can be used.

Returning generally to FIGS. 1 and 2, the lug 118 includes a first tool engagement portion 150 and a first frangible portion 154 that is coaxial with the axis 22. In the example provided, the lug 118 can also include a rim 158 disposed axially between the first tool engagement portion 150 and the first frangible portion 154. The first tool engagement portion 150 defines the other terminal end 162 of the bolt 14, opposite the external threads 126.

Figure 6:
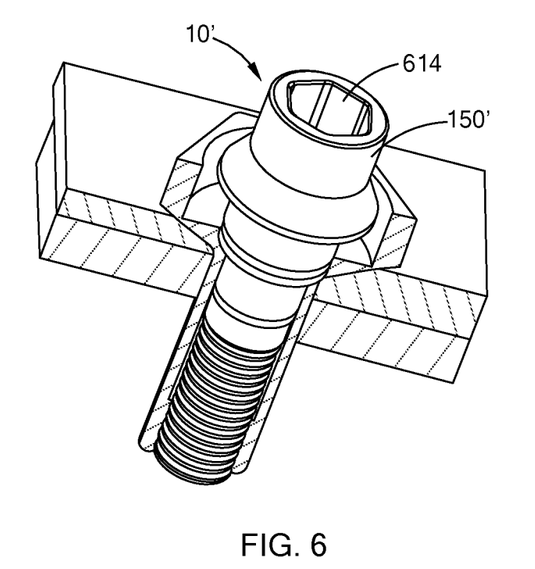
FIG. 6 is a partial sectional view of a blind fastener of a second construction in accordance with the teachings of the present disclosure.

With specific reference to FIG. 3, the first tool engagement portion 150 is configured to be engaged by a tool 310 to impart torque about the axis 22. In the example provided, the first tool engagement portion 150 has a plurality of flat, external surfaces that form a hexagonal shape and the tool 310 includes a first socket 314 that has an first tool cavity defined by a plurality of flat, interior surfaces configured to mate with the hexagonal shape of the first tool engagement portion 150, although other shapes or configurations can be used, such as star, spline, or lobe shapes or other driving configurations. For example, a blind fastener 10' of an alternative configuration is shown in FIG. 6. The blind fastener 10' is similar to the blind fastener 10 (FIGS. 1-5) except as otherwise shown and described herein. Accordingly, similar features are denoted by similar, but primed numerals and only differences are described herein. The first tool engagement portion 150' can have a female tool engagement feature such as a recessed socket 614, while the tool 310 (FIG. 3) can have a mating male feature such as a male protrusion socket (not shown).

Returning generally to FIGS. 1 and 2, the first tool engagement portion 150 extends from the terminal end 162 of the bolt 14 in the axial direction toward the bolt head 114 and is joined to the bolt head 114 by the first frangible portion 154. In the example provided, the rim 158 joins the first tool engagement portion 150 to the first frangible portion 154. The rim 158 extends radially outward from the first tool engagement portion 150. In the example provided, the rim 158 has a generally frustoconical shape that widens with increased distance from the first tool engagement portion 150 until reaching a maximum diameter.

With specific reference to FIG. 3, the maximum diameter of the rim 158 can be greater than the diameter of an outer surface 166 of the first frangible portion 154, such that the rim 158 and outer surface 166 of the first frangible portion 154 form a shoulder 170. When the first tool engagement portion 150 is received in the first socket 314, an axial end of the first socket 314 can contact the rim 158 (e.g., at the frustoconical surface of the rim 158) to limit movement of the tool 310 relative to the bolt 14 in the axial direction toward the bolt head 114.

The first frangible portion 154 frangibly couples the rim 158 to the bolt head 114. In the example provided, the outer surface 166 of the first frangible portion 154 is generally cylindrical in shape and has a diameter that is approximately equal to the outermost diameter of the perimeter surface 142 of the bolt head 114, though other configurations can be used. The first frangible portion 154 narrows from the outer surface 166 to a break neck 174 that joins the first end surface 146 of the bolt head 114 with the lug 118. The break neck 174 has a diameter that is less than the diameter of the perimeter surface 142 of the bolt head 114. Thus, the first end surface 146 and the first frangible portion 154 define a break groove 178, wherein the break neck 174 defines the innermost diameter of the break groove 178. In the example provided, the diameter of the break neck 174 is also less than the diameter of the first outer surface 134 of the stem 122.

Returning generally to FIGS. 1 and 2, the nut 18 can be a formed from a single, integral piece of material and can include a sleeve 210, a nut head 214, and a handling member 218 disposed about the axis 22. The sleeve 210 is a generally cylindrical body that has one end that defines one terminal end 222 of the nut and an opposite end that is connected to the nut head 214. The sleeve 210 has a generally cylindrically shaped second outer surface 226 having a diameter that is equal to or slightly less than the diameter of the inner bore 54 of the first and second workpieces 26, 30 (FIG. 3) so that the sleeve 210 can be received in the inner bore 54 (FIG. 3). In the example provided, the sleeve 210 also includes a plurality of dimples 228 recessed radially inward from the second outer surface 226. The dimples 228 can be proximate to the terminal end 222 and equally spaced in the circumferential direction about the sleeve 210. The dimples 228 can protrude slightly into the first central bore 230 so that they extend radially inward of the major diameter of the internal threads 234 and provide an interference fit with the external threads 126. Thus, the dimples 228 can provide some minor resistance to rotation between the internal and external threads 234, 126.

The sleeve 210 defines a central first bore 230 that is coaxial with the axis 22 and includes a plurality of internal threads 234 proximate to the terminal end 222 of the nut 18. With specific reference to FIG. 3, the internal threads 234 start at the terminal end 222 and extend in the axial direction toward the nut head 214, but terminate a predetermined distance from the second back surface 46. The internal threads 234 are configured to matingly threadably engage with the external threads 126 of the bolt 14. The first bore 230 can be generally smooth from the termination of the internal threads 234 axially toward the nut head 214 and have a diameter that is slightly greater than the diameter of the first outer surface 134 of the stem 122 so that the shaft 110 can be rotatably received in the first bore 230.

In the example provided, the sleeve 210 includes a ductile region 238 that is located between internal threads 234 and the nut head 214. The ductile region has a hardness that is less than a hardness of the rest of the nut 18. For example, the nut head 214, a region of the sleeve 210 that is surrounded by the first and second workpieces 26, 30 when fully inserted in the aperture 50, and the region of the sleeve 210 that includes the internal threads 234 can have a first hardness value, while the ductile region 238 can have a significantly lower hardness value. This significantly lower hardness value can be achieved by band annealing the sleeve 210 for example.

In the example provided, the hardness value of the ductile region 238 varies along the entire length of the ductile region 238 such that the ductile region 238 is a variable annealed zone. In the example provided, a location of minimum hardness value is located approximately half-way between the location where the sleeve emerges from the second back surface 46 (at the minimum grip length 62) and the location where the internal threads 234 terminate distal to the terminal end 222. In the example provided, the hardness of the ductile region 238 increases with increased axial distance from the location of minimum hardness until reaching the first hardness value (e.g., at of the internal threads 234 and at the region of the sleeve 210 within the minimum grip length 62). In the example provided, the ductile region 238 can have a tensile strength two-thirds the tensile strength of the rest of the nut 18 or less.

The nut head 214 extends axially from an end of the sleeve 210 that is opposite the internal threads 234. The nut head 214 extends radially outward of the sleeve 210 such that the nut head 214 extends radially outward of the cylindrical inner bore 54.

With specific reference to FIG. 4, the nut head 214 includes a recess 242, a clamp surface 246, and a second end surface 250. In the example provided, the nut head 214 also includes a perimeter surface 254. The clamp surface 246 extends radially outward from the second outer surface 226 of the sleeve 210. In the example provided, the clamp surface 246 extends radially outward at an angle relative to the second outer surface 226 that is greater than 90°, though other configurations can be used. The clamp surface 246 extends radially outward to the perimeter surface 254 of the nut head 214.

The perimeter surface 254 generally extends axially away from the sleeve 210 and toward the second end surface 250. In the example provided, the perimeter surface 254 is generally parallel with the axis 22, though other configurations can be used. The perimeter surface 254 has a diameter that is less than a maximum diameter of the contact surface 58 of the aperture 50. The second end surface 250 faces axially away from the sleeve 210. In the example provided, the second end surface 250 is generally perpendicular to the axis 22, though other configurations can be used.

One axial end of the recess 242 is open at the second end surface 250 and the other axial end of the recess 242 is open to the first bore 230. The recess 242 is disposed coaxially about the axis 22 and configured to receive the bolt head 114. The recess 242 has an inner wall surface 258 and a contact surface 262. The contact surface 262 extends radially outward from the first bore 230. In the example provided, the contact surface 262 extends at an angle relative to the axis 22, such that the contact surface 262 extends radially outward from the first bore 230 and axially toward the second end surface 250. In the example provided, the inner wall surface 258 is generally cylindrical and extends axially between the contact surface 262 and the second end surface 250. The inner wall surface 258 has a diameter that is greater than the diameter of the perimeter surface 142 of the bolt head 114 so that the bolt head 114 can be received in the recess 242.

In the example provided, the contact surface 262 of the nut head 214 can be at an angle that can be similar to the angle of the clamp surface 138 of the bolt head 114. The inner wall surface 258 of the nut head 214 extends axially from the second end surface 250 to the contact surface 262 of the nut head 214 a distance that is equal to or greater than the axial length of the perimeter surface 142 of the bolt head 114. Thus, when the bolt head 114 is received in the recess 242, the clamp surface 138 of the bolt head 114 contacts the contact surface 262 of the recess 242 and the first end surface 146 of the bolt head 114 is flush with or recessed from the second end surface 250 of the nut head 214.

The handling member 218 includes a second tool engagement portion 266 and a second frangible portion 270 disposed about the axis 22. The handling member 218 defines a second bore 274 coaxial with the axis 22 and open at the other terminal end 278 of the nut 18 that is opposite the sleeve 210 and open to the central bore 230. The second bore 274 surrounds at least a portion of the lug 118 when the bolt head 114 is received in the recess 242. In the example provided, the second bore 274 is defined by a cylindrical interior surface that has a diameter greater than the diameter of the rim 158 of the lug 118 and the terminal end 278 of the nut 18 overlaps in the axial direction with a portion of the rim 158, though other configurations can be used. The second bore 274 extends axially from the terminal end 278 to the second end surface 250 of the nut head 214. In the example provided, the second bore 274 has a diameter that can be similar to the diameter of the perimeter surface 254, though other configurations can be used.

Figure 8:
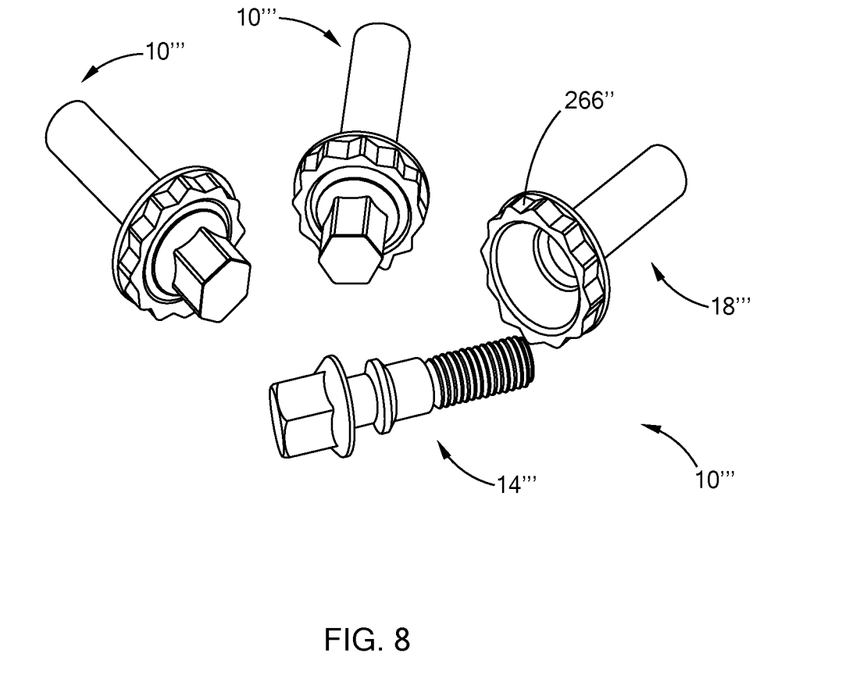
FIG. 8 is a perspective view showing three blind fasteners of a fourth construction in accordance with the teachings of the present disclosure.
Figure 9:
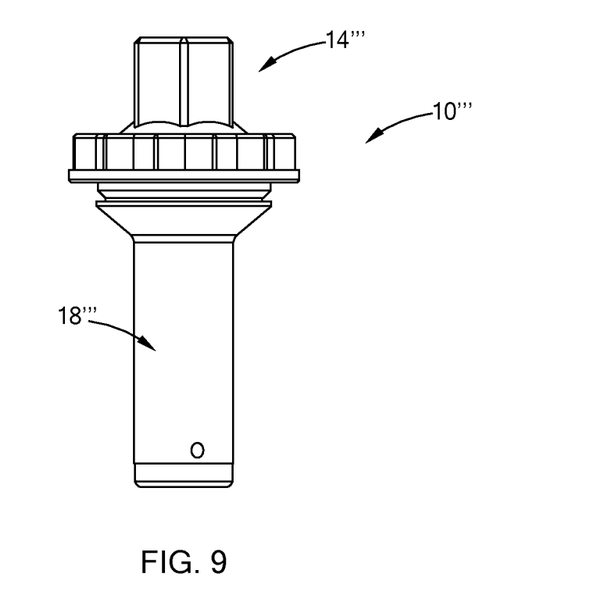
FIG. 9 is a side view of one of the blind fasteners of FIG. 8.
Figure 10:
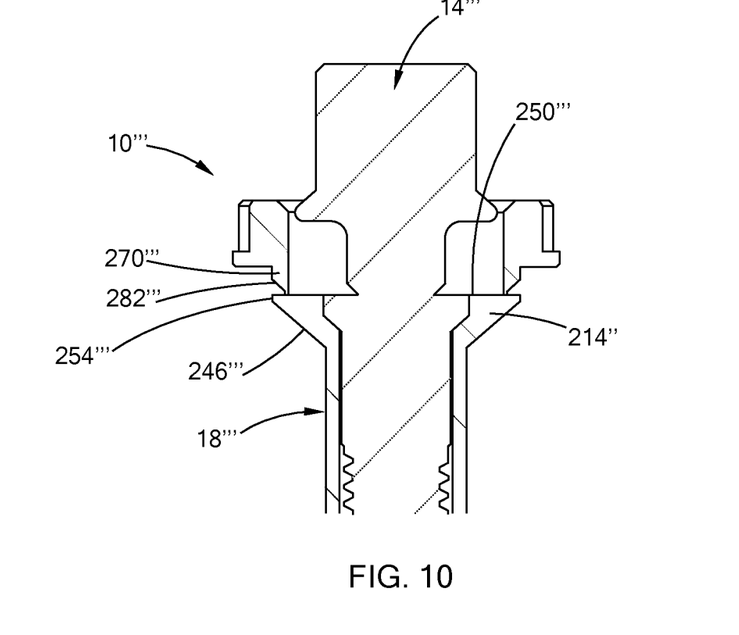
FIG. 10 is a cross-sectional view of the blind fastener of FIG. 8.

The second tool engagement portion 266 defines the terminal end 278 of the nut 18. The second tool engagement portion 266 is configured to be engaged by the tool 310 (FIG. 3) to impart torque about the axis 22. In the example provided, the second tool engagement portion 266 has a plurality of flat, external perimeter surfaces that form a hexagonal shape and the tool 310 (FIG. 3) includes a second socket 330 (FIG. 3) that has a second tool cavity defined by a plurality of flat, interior surfaces configured to mate with the hexagonal shape of the second tool engagement portion 266, though other shapes or configurations can be used, such as star, spline, or lobe shapes or other driving configurations. For example, a blind fastener 10''' of an alternative configuration is shown in FIGS. 8-10. The blind fastener 10''' is similar to the blind fastener 10 (FIGS. 1-5), 10' (FIG. 6), or 10'' (FIG. 7) except as otherwise shown and described herein. Accordingly, similar features are denoted by similar, but triple primed numerals and only differences are described herein. The second tool engagement portion 266''' can have a multi-point star engagement feature such as the 12 point star shown, while the tool 310 (FIG. 3) can have a mating feature.

Returning to FIG. 4, the second frangible portion 270 frangibly couples the second tool engagement portion 266 to the nut head 214. In the example provided, the inner surface of the second frangible portion 270 is defined by the second bore 274 and an outer surface 282 of the second frangible portion 270 can narrow in a frustoconical manner from the exterior surfaces of the second tool engagement portion 266 to the perimeter surface 254 of the nut head 214. Thus, the handling member 218 has a minimum wall thickness at a location where the second frangible portion 270 meets the nut head 214.

Returning generally to FIGS. 3 and 4, the bolt 14 and nut 18 are shown in a preinstalled position relative to each other. Installation of the blind fastener 10 can begin by first inserting the bolt 14 into the first bore 230 of the nut 18 and rotating the bolt 14 relative to the nut 18 to engage the internal and external threads 234, 126 until the bolt head 114 is received in the recess 242 and the bolt 14 and nut 18 are in the preinstalled position relative to each other. Once in the preinstalled position, the blind fastener 10 can be inserted into the aperture 50 of the first and second workpieces 26, 30 as shown in FIGS. 3 and 4 until the clamp surface 246 of the nut 18 contacts the contact surface 58 of the first workpiece 26. Alternatively, the nut 18 can first be inserted into the aperture 50, then the bolt 14 can be inserted into the first bore 230 and rotated to engage the internal and external threads 234, 126 until the bolt head 114 is received in the recess 242.

With the blind fastener 10 in the preinstalled position and extending through the first and second workpieces 26, 30, as shown in FIGS. 3 and 4, the second end surface 250 of the nut head 214 is flush with or recessed from the first front surface 34. The sleeve 210 has an axial length that is longer than the maximum grip length 66 of the first and second workpieces 26, 30, so that the sleeve 210 can be received through the aperture 50 and extend from the second back surface 46.

In this position, the first socket 314 of the tool 310 can mate with and engage the first tool engagement portion 150 and the second socket 330 of the tool 310 can mate with and engage the second tool engagement portion 266. The tool 310 can be operated in a first mode such that the first socket 314 transmits torque to the bolt 14 in the tightening direction of the threads 126, 234, while the second socket 330 holds the nut 18 rotationally stationary relative to the work pieces 26, 30. The first socket 314 can engage the rim 158 of the bolt 14 to inhibit the bolt 14 from moving axially away from the nut 18 and the second socket 318 can engage the handling member 218 of the nut 18 to inhibit the nut 18 from moving axially away from the workpieces 26, 30.

Figure 5:
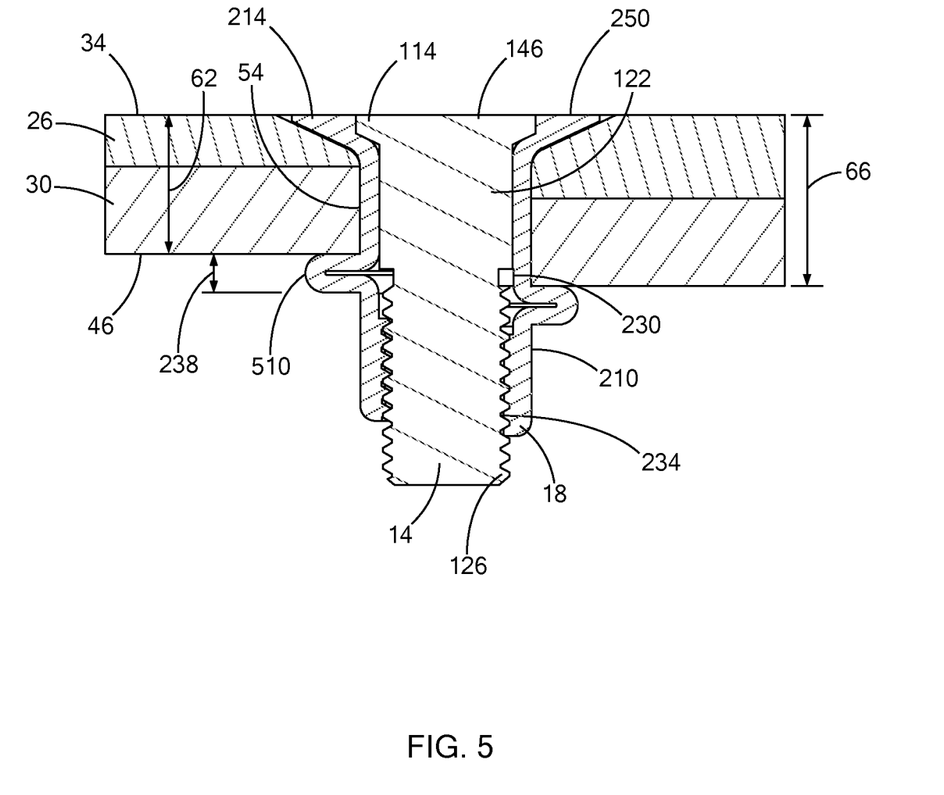
FIG. 5 is a cross-sectional view of the blind fastener of FIG. 1 in an installed position, illustrating the blind fastener installed relative to the minimum panel thickness and the maximum panel thickness.

With continued reference to FIG. 3 and additional reference to FIG. 5, since the bolt 14 is rotated in the tightening direction while the bolt 14 and nut 18 are held axially stationary, the threads 126, 234 impart an axial force on the sleeve 210 to move the terminal end 222 of the sleeve 210 toward the work pieces 26, 30, causing the ductile region 238 of the sleeve 210 to deform. Since the bore 230 of the sleeve 210 is equal to or only slightly greater in diameter than the stem 122 and the major diameter of the external threads 126, the ductile region 238 deforms radially outwards. Since the minimum hardness of the ductile region 238 is disposed axially between the second back surface 46 and the internal threads 234, the ductile region 238 deforms to form a bulb 510 that has a diameter that is greater than the diameter of the bore 54. The bulb 510 contacts the second back surface 46 and can impart a force thereon that biases the second workpiece 30 toward the first workpiece 26. Thus, the first and second workpieces 26, 30 can be clamped between the nut head 214 and the bulb 510.

Once the bulb 510 is formed, the bulb 510 and sleeve 210 can resist further deformation. Additional torque applied to the bolt 14 above a first predetermined torque threshold value can then cause the first frangible portion 154 to break. More specifically, the lug 118 is rotated in the tightening direction while the nut 18 is held rotationally and axially stationary. The threads 126, 234 impart an axial force on the sleeve 210 until the shear strength of the break neck 174 is exceeded. The break neck 174 can then shear, separating the lug 118 from the bolt head 114. The shearing of the break neck 174 can leave the first end surface 146 of the bolt head 114 flush with or recessed from the second end surface 250 of the nut head 214, as shown in FIG. 5. The shear strength of the break neck 174 can depend on the diameter and type of material.

The clamping force of the bulb 510 and the nut head 214 on the workpieces 26, 30 can resist rotation of the nut 18 relative to the workpieces 26, 30. The second socket 330 can then apply torque to the handling member 218 in an amount that exceeds a predetermined torque threshold value to cause the second frangible portion 270 to break. More specifically, the second frangible portion 270 can shear at the perimeter surface 254, separating the handling member 218 from the nut head 214. The shearing of the second frangible portion 270 can leave the second end surface 250 of the nut head 214 flush with or recessed from the first front surface 34 of the first workpiece 26, as shown in FIG. 5. The shear strength of the second frangible portion 270 can depend on the diameter (e.g., thickness) and type of material.

Thus, the blind fastener 10 can be easily installed and while being flush with the first workpiece 26 when in the fully installed position (shown in FIG. 5) without the need for further machining or processing.

Figure 7:
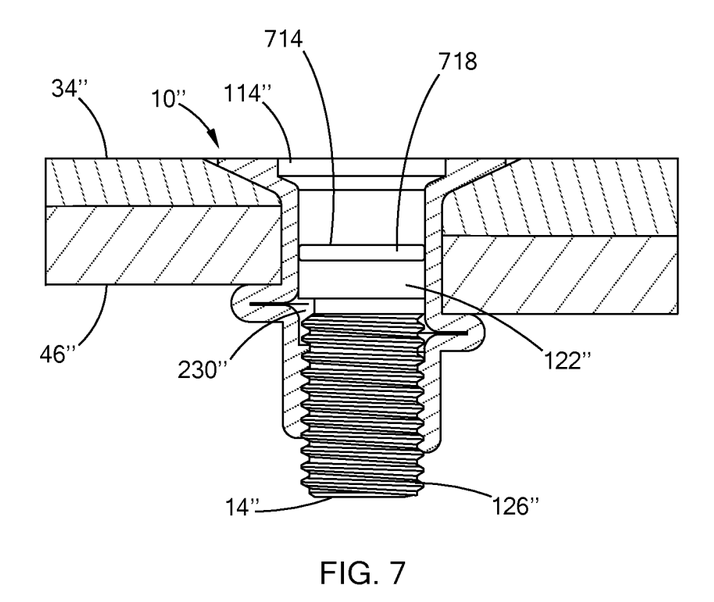
FIG. 7 is a partial sectional view of a blind fastener of a third construction in accordance with teachings of the present disclosure.

With additional reference to FIG. 7, a blind fastener 10" of a third construction is illustrated. The blind fastener 10" is similar to the blind fastener 10 (FIG. 1-5) or 10' (FIG. 6) except as otherwise shown and described herein. Accordingly, similar features are denoted by similar, but double primed numerals and only differences are described herein. Specifically, the blind fastener 10" includes a groove 714 that extends circumferentially about the stem 122" at a location axially between the bolt head 114" and the step down or external threads 126". In the example provided, the groove 714 is disposed axially between the surface first front surface 34" and the second back surface 46". A seal, such as an elastomeric o-ring 718 is disposed within the groove 714 and seals between the bolt 14" and the inner surface of the first central bore 230" to inhibit passage of fluids (e.g., water, oil, fuel, etc.) therebetween.

With additional reference to FIGS. 8-10, the blind fastener 10''' of the fourth construction is illustrated. The second frangible portion 270''' of the blind fastener 10''' also differs from that of blind fasteners 10 (FIGS. 1-5), 10' (FIG. 6), or 10" (FIG. 7) in that the second frangible portion 270''' defines a conical surface 282''' that narrows toward the nut head 214''' and connects directly to the end surface 250''' of the nut head 214''' at a location that is radially inward of the perimeter surface 254'''. The second frangible portion 270''' is similarly configured to break off to create a flush end surface 250'''.

It should be noted that the disclosure is not limited to the form described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

As used herein, the phrase at least one of A, B, and C should be construed to mean a logical (A OR B OR C), using a non-exclusive logical OR, and should not be construed to mean "at least one of A, at least one of B, and at least one of C.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A blind fastener for connecting a plurality of panels, comprising:

a bolt including a shaft, a bolt head, and a lug, the bolt head being disposed between the shaft and the lug and extending radially outward from the shaft, an end of the shaft opposite the bolt head defining external threads, the lug including a first tool engagement portion and a first frangible portion that frangibly couples the lug to the bolt head; and a nut including a sleeve, a nut head, and a handling member, the sleeve including a central bore configured to receive the shaft and defining internal threads configured to mate with the external threads, the nut head being disposed between the handling member and the sleeve, the nut head extending radially outward from the sleeve and defining a recess configured to receive the bolt head, the handling member being configured to surround at least a portion of the lug, the handling member including a second frangible portion and a second tool engagement portion, the second frangible portion frangibly coupling the second tool engagement portion to the nut head, wherein the nut head further defines a first conical surface configured to abut a countersunk surface of a front panel of the plurality of panels, the first conical surface of the nut head extending radially outward to a radially outermost surface of the nut head, the radially outermost surface being substantially parallel to a central axis of the nut, the handling member defining a second conical surface that extends radially outward from the radially outermost surface of the nut head.

2. The blind fastener of claim 1, wherein an end surface of the bolt head is flush with or recessed from an end surface of the nut head when the bolt is in threaded engagement with the nut.

3. The blind fastener according to claim 1, wherein the first frangible portion is configured to break off from the bolt head such that an end surface of the bolt head is flush with or recessed from a front panel of the plurality of panels, and the second frangible portion is configured to break off from the nut head such that an end surface of the nut head is flush with or recessed from the front panel.

4. The blind fastener according to claim 1, wherein a radially outward surface of the sleeve includes a plurality of dimples to retain the bolt from free rotation.

5. The blind fastener according to claim 1, wherein the nut defines a counter bore having an enlarged part and a threaded part, the enlarged part being formed in the handling member and having a larger inside diameter than the threaded part, wherein the threaded part defining the internal threads and being disposed in an end of the sleeve that is distal to the nut head.

6. The blind fastener according to claim 1, wherein the blind fastener consists of two pieces when in a pre-installed condition, the bolt being a first one of the two pieces and the nut being a second one of the two pieces.

7. The blind fastener of claim 1, wherein the second frangible portion extends axially from an end surface of the nut head.

8. The blind fastener of claim 1, wherein the handling member has a minimum wall thickness at a location where the second frangible portion meets the nut head.

9. The blind fastener of claim 1, wherein the first frangible portion is a groove that extends around a full circumference of the bolt.

10. The blind fastener of claim 1, wherein the lug includes a rim that is disposed axially between the first tool engagement portion and the first frangible portion and extends radially outward of the tool engagement portion, the rim being adapted to limit axial movement of a tool toward the bolt head when the tool is engaged with the first tool engagement portion.

11. The blind fastener of claim 1, wherein the first tool engagement portion has a first predetermined shape and the second tool engagement portion has a second predetermined shape, the first predetermined shape adapted to engage a first mating portion of a tool to permit torque transmission between the tool and the bolt, the second predetermined shape adapted to engage a second mating portion of the tool to permit torque transmission between the tool and the nut.

12. The blind fastener of claim 1, further comprising a seal member in contact with the shaft and the sleeve to form a seal therebetween.

13. The blind fastener of claim 1, wherein when the blind fastener is in a pre-installed condition, the sleeve includes a ductile zone that has a hardness that is less than a hardness of the nut head, a portion of the sleeve between the ductile zone and the nut head, and a portion of the sleeve at the internal threads.

14. The blind fastener of claim 13, wherein the ductile zone is a variable annealed zone that has a hardness that varies along the entire length of the ductile zone.

15. The blind fastener of claim 1, wherein when the blind fastener is in a pre-installed condition, the sleeve includes a variable annealed zone that has a hardness that is less than a hardness of the nut head and less than a hardness of the portion including the internal threads.

16. A blind fastener comprising:
a single piece bolt including:
a shaft;
a bolt head extending radially outward from the shaft, an end of the shaft opposite the bolt head defining external threads; and
a lug, the bolt head being disposed between the shaft and the lug, the lug including a first tool engagement portion and a first frangible portion that frangibly couples the first tool engagement portion to the bolt head; and
a single piece nut including:
a sleeve including a central bore configured to receive the shaft, the sleeve defining internal threads engaged with the external threads;
a nut head extending radially outward from the sleeve and defining a recess configured to receive the bolt head, an outer surface of the bolt head being flush or recessed relative to an outer surface of the nut head when the bolt head is received in the recess;
a handling member, the nut head being axially between the handling member and the sleeve, the handling member including a second tool engagement portion and a second frangible portion, the second tool engagement portion being configured to surround at least a portion of the lug, the second frangible portion frangibly coupling the second tool engagement portion to the nut head, and
a seal member in contact with the shaft and the sleeve to form a seal therebetween,
wherein the sleeve includes a first zone proximate to the nut head, a second zone at the internal threads, and a ductile zone between the first and second zones, the ductile zone being more ductile than the first or second zones, and
wherein the ductile zone is a variable annealed zone that has a hardness that varies along the entire length of the ductile zone, wherein a location of minimum hardness is located approximately half-way between the first zone and the second zone and the hardness of the sleeve in the ductile zone increases with increased axial distance from the location of minimum hardness until reaching the first zone and second zone.

17. The blind fastener according to claim 16, wherein the nut head further defines a first conical surface configured to abut a countersunk surface of a front workpiece of a plurality of workpieces to be connected by the blind fastener, wherein the first conical surface of the nut head extends radially outward to a radially outermost surface of the nut head, and the handling member defines a second conical surface that extends radially outward from the outermost surface of the nut head.

18. The blind fastener of claim 16, wherein the lug includes a rim that is disposed axially between the first tool engagement portion and the first frangible portion and extends radially outward of the tool engagement portion, the rim being adapted to limit axial movement of a tool toward the bolt head when the tool is engaged with the first tool engagement portion.

19. The blind fastener of claim 1, wherein the handling member defines a second bore, the second bore having a diameter that is greater than a diameter of the recess, wherein a diameter of the radially outermost surface of the nut head is substantially equal to the diameter of the second bore.

20. A blind fastener for connecting a plurality of panels, comprising:

a bolt including a shaft, a bolt head, and a lug, the bolt head being disposed between the shaft and the lug and extending radially outward from the shaft, an end of the shaft opposite the bolt head defining external threads, the lug including a first tool engagement portion and a first frangible portion that frangibly couples the lug to the bolt head; and a nut including a sleeve, a nut head, and a handling member, the sleeve including a central bore configured to receive the shaft and defining internal threads configured to mate with the external threads, the nut head being disposed between the handling member and the sleeve, the nut head extending radially outward from the sleeve and defining a recess configured to receive the bolt head, the handling member being configured to surround at least a portion of the lug, the handling member including a second frangible portion and a second tool engagement portion, the second frangible portion frangibly coupling the second tool engagement portion to the nut head; and a seal member in contact with the shaft and the sleeve to form a seal therebetween.

\* \* \* \* \*